(12) United States Patent
Barve (10) Patent No.: US 8,337,345 B2
(45) Date of Patent: Dec. 25, 2012

(54) SLIDING RACK RATCHET TENSIONER

(75) Inventor: Anand Arun Barve, Ithaca, NY (US)

(73) Assignee: BorgWarner Inc., Auburn Hills, MI (US)

( * ) Notice: Subject to any disclaimer, the term of this patent is extended or adjusted under 35 U.S.C. 154(b) by 712 days.

(21) Appl. No.: 12/523,362

(22) PCT Filed: Jan. 11, 2008

(86) PCT No.: PCT/US2008/050826
§ 371 (c)(1),
(2), (4) Date: Jul. 16, 2009

(87) PCT Pub. No.: WO2008/094740
PCT Pub. Date: Aug. 7, 2008

(65) Prior Publication Data
US 2010/0022339 A1    Jan. 28, 2010

Related U.S. Application Data

(60) Provisional application No. 60/886,686, filed on Jan. 26, 2007.

(51) Int. Cl.
*F16H 7/08* (2006.01)
*G05G 3/00* (2006.01)
*B23P 11/00* (2006.01)

(52) U.S. Cl. .......................... 474/111; 474/109; 74/578

(58) Field of Classification Search ................. 474/101, 474/109, 110, 111, 140; 74/578
See application file for complete search history.

(56) References Cited

U.S. PATENT DOCUMENTS

| | | | |
|---|---|---|---|
| 5,304,099 A | * | 4/1994 | Deppe et al. ................. 474/110 |
| 5,346,436 A | | 9/1994 | Hunter et al. |
| 5,366,415 A | * | 11/1994 | Church et al. ............... 474/110 |
| 5,577,970 A | | 11/1996 | Smith et al. |
| 6,045,471 A | | 4/2000 | Suzuki |
| 6,165,090 A | | 12/2000 | Simpson |
| 6,244,981 B1 | | 6/2001 | Simpson |

(Continued)

FOREIGN PATENT DOCUMENTS

EP    0989333 A1    3/2000

(Continued)

OTHER PUBLICATIONS

Supplementary European Search Report for EP08727574, dated Mar. 4, 2010, 8 pages.

(Continued)

*Primary Examiner* — Michael Mansen
*Assistant Examiner* — Robert T Reese
(74) *Attorney, Agent, or Firm* — Brown & Michaels, PC (57) ABSTRACT

The high-performance sliding rack ratchet tensioner is inexpensively manufactured. A rack having rack teeth is slidingly received in a rack slot on the side of the piston. The rack slot is preferably open-ended on the end facing the tensioner arm. The rack and piston are both received in a piston bore in the tensioner body. The rack length is preferably shorter than the rack slot length to provide backlash. A pawl mounted in a pawl bore perpendicular to the rack bore engages the rack. The open-ended rack slot allows the rack to be inserted after the piston during assembly. The rack and pawl preferably have shark fin-shaped teeth. The pawl preferably has dummy teeth to ensure that the load is shared by the center teeth.

22 Claims, 7 Drawing Sheets

U.S. PATENT DOCUMENTS

| | | |
|---|---|---|
| 6,547,684 B2 | 4/2003 | Kurohata |
| 6,612,082 B2 | 9/2003 | Schimmelpfennig et al. |
| 6,878,082 B2 | 4/2005 | Seungpyo |
| 7,455,606 B2 * | 11/2008 | Markley et al. ............... 474/109 |
| 2003/0125143 A1 | 7/2003 | Seungpyo |
| 2004/0204272 A1 | 10/2004 | Seungpyo et al. |
| 2005/0239589 A1 * | 10/2005 | Seungpyo et al. ............ 474/110 |

FOREIGN PATENT DOCUMENTS

| | | |
|---|---|---|
| EP | 1138979 A2 | 10/2001 |
| EP | 1323950 A1 | 7/2003 |
| EP | 1512887 A1 | 3/2005 |
| EP | 1538368 A1 | 6/2005 |
| EP | 1561967 A1 | 8/2005 |
| JP | 05086057 U | 11/1993 |

OTHER PUBLICATIONS

PCT Search Report and Written Opinion; PCT/US2008/050826; Jun. 20, 2008, 11 pages.

* cited by examiner

Fig. 1

PRIOR ART

Fig. 2

PRIOR ART

SLIDING RACK RATCHET TENSIONER

REFERENCE TO RELATED APPLICATIONS

This application claims one or more inventions which were disclosed in Provisional Application No. 60/886,686, filed Jan. 26, 2007, entitled "SLIDING RACK RATCHET TENSIONER". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of ratchet tensioners. More particularly, the invention pertains to a ratcheting mechanism for a ratchet tensioner.

2. Description of Related Art

Rack and pawl ratchet chain tensioners are known in the art. Known tensioners include separate rack versions and integral rack versions, where the rack is commonly formed integrally along the side of the piston. This greatly increases the expense of manufacturing the piston.

Figure 1:
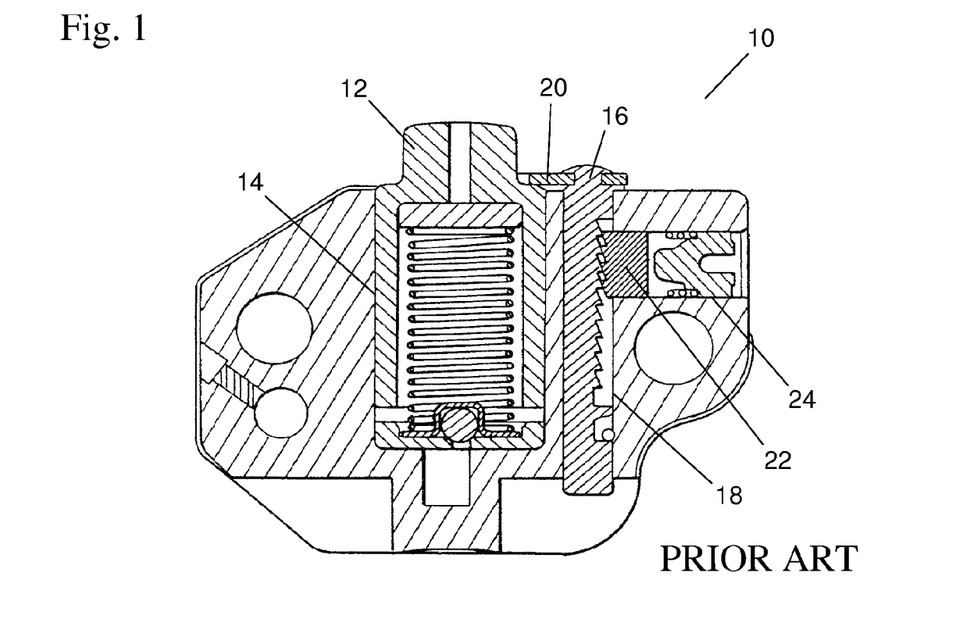
FIG. 1 shows a prior art rack and washer hydraulic tensioner.

A rack and washer hydraulic tensioner 10, as disclosed in U.S. Pat. Nos. 5,346,436, 5,577,970, and 6,165,090 and shown in FIG. 1, has a piston 12 mounted in a piston bore 14. The rack 16 engages the piston and is mounted in a separate rack bore 18. The rack 16 is coupled to the piston 12 by a washer or flange 20 attached to the head of the rack 16 and extending over a shoulder on the piston 12. A pawl 22, having teeth and mounted in a pawl bore 24 perpendicular to the rack bore 18, engages the teeth of the rack 16. The rack 16 has significant inertia as a result of its relatively higher mass. Upon initial release when the piston extends to tension the chain and comes to a hard stop, the rack may overshoot, thereby reducing the backlash of the tensioner arm and subsequently inducing higher chain loads than desired.

Figure 2:
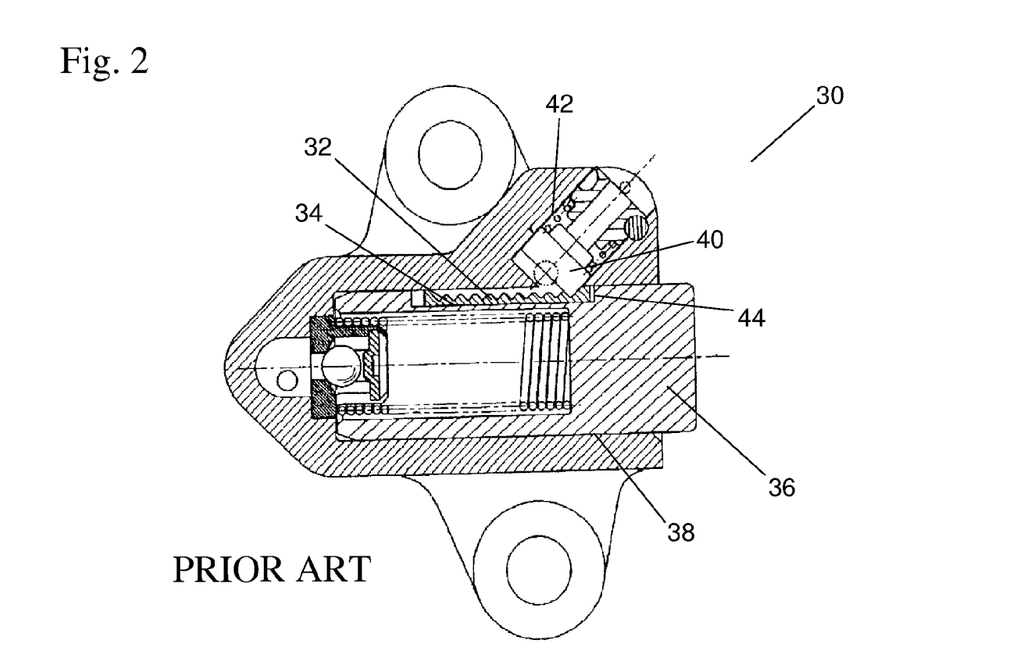
FIG. 2 shows a prior art sliding rack tensioner.

A hydraulic tensioner 30, as disclosed in U.S. Pat. No. 6,878,082 and shown in FIG. 2, has a rack 32 mounted in a slot 34 of the piston 36. The rack 32 and piston 36 are both mounted in a piston bore 38. Elimination of a rack bore simplifies the manufacture of this tensioner 30. The rack 32 is small and also easily manufactured. The rack 32 is slidable in the rack slot 34, and backlash is provided by a rack slot 34 length that is greater than the length of the rack 32. A toothless pawl 40 mounted in a pawl bore 42 at an angle to the piston bore 38 engages one of the teeth of the rack 32. Although this tensioner has several advantages over the rack and washer tensioner, the closed rack slot 34 requires more care and complexity during assembly of the tensioner, because the rack 32 must be placed into the slot 34 prior to insertion of the piston 36 into the piston bore 38. Also, repeated impacts between the rack 32 and the piston 36 at the end 44 of the rack slot 34 during operation requires the rack 32 and the piston impact area 44 to be highly durable for optimum performance. Additionally, the angle on the pawl bore increases manufacturing costs.

There is a need in the art for a low-cost rack and pawl ratchet tensioner with adjustable backlash.

SUMMARY OF THE INVENTION

The high-performance sliding rack ratchet tensioner is inexpensively manufactured. A rack having rack teeth is slidingly received in a rack slot on the side of the piston. The rack slot is preferably open-ended on the end facing the tensioner arm. The rack and piston are both received in a piston bore in the tensioner body. The rack length is preferably shorter than the rack slot length to provide backlash. A pawl mounted in a pawl bore perpendicular to the rack bore engages the rack. The open-ended rack slot allows the rack to be inserted after the piston during assembly. The rack and pawl preferably have shark fin-shaped teeth. The pawl preferably has dummy teeth to ensure that the load is shared by the center teeth.

In one embodiment, the ratchet tensioner includes a tensioner body, a piston, a first biasing member, a rack, a pawl, and a second biasing member. The tensioner body has a piston bore open at one end and a pawl bore extending into the piston bore. The piston has an outer circumference slidably received in the piston bore and a rack slot axially extending and formed as part of the outer circumference. The rack slot has an open end at the outward end of the piston. The first biasing member biases the piston in a protruding direction. The rack includes a plurality of rack teeth and is slidably received in the rack slot. The pawl is slidably received in the pawl bore and includes a plurality of pawl teeth. The second biasing member biases the pawl toward the rack. The pawl teeth engage the rack teeth, thereby permitting travel of the piston in the protruding direction but resisting travel of the piston in a retracting direction opposite the protruding direction above a designed backlash.

In a preferred embodiment, the pawl has an outer circumference slidably received in the pawl bore. The plurality of pawl teeth includes a first dummy tooth, a first center tooth adjacent to the first dummy tooth, a second center tooth adjacent to the first center tooth on a side opposite the first dummy tooth, and a second dummy tooth adjacent to the second center tooth on a side opposite the first center tooth. The distance between a vertical surface of the first center tooth and a vertical surface of the second center tooth is equal to a pitch of the rack teeth. A distance between a vertical surface of the first dummy tooth and the vertical surface of the first center tooth is less than the pitch of the rack teeth. A distance between the vertical surface of the second center tooth and a vertical surface of the second dummy tooth is greater than the pitch of the rack teeth. The vertical surface of the first center tooth and the vertical surface of the second center tooth bear load from the rack teeth. The vertical surface of the first dummy tooth, and the vertical surface of the second dummy tooth do not contact the rack teeth and are not loaded by the rack.

Preferably the tensioner has a reset bore extending into the pawl bore, and the pawl has a tapered surface facing the reset bore and tapering toward the pawl teeth, such that a locking pin inserted into the reset bore slides along the tapered surface to push the pawl away from the rack and into a reset position. The tensioner preferably includes a retainer having a retainer tail inserted into the pawl bore. The retainer tail engages a pawl slot in the pawl to maintain a correct orientation of the pawl teeth with respect to the rack teeth after assembly. The pawl slot is preferably on a side opposite the pawl teeth such that insertion of the shipping pin through the reset bore in between the retainer tail and the pawl slot maintains the pawl teeth in engagement with the rack teeth in a shipping position by not allowing the pawl to retract. The reset bore is preferably perpendicular to the pawl bore.

The piston is preferably hollow such that the piston and the tensioner body define an inner space for hydraulic fluid, and the ratchet tensioner preferably includes a check valve at a bottom portion of the piston bore to permit fluid flow into the inner space and to block fluid flow in a reverse direction. The pawl bore is preferably perpendicular to the piston bore. The rack preferably has a length less than a length of the rack slot to provide the designed backlash. Preferably, the outward end of the piston has a convex shape and the outward end of the rack is contoured to the convex shape for contacting a tensioner arm pad attached to or integral with the tensioner arm for contacting and tensioning a chain or belt. The rack teeth and the pawl teeth preferably have a shark fin-shape. In one embodiment, the rack slot and a side of the rack opposite the rack teeth are oriented at a rack angle with respect to the axis of the piston bore such that the rack and the rack slot taper out toward the open end of the rack slot. The rack angle is preferably selected such that wedging of the rack between the piston and a wall of the piston bore is prevented when the piston moves in the retracting direction before the designed backlash provided by a difference between a length of the rack slot and a length of the rack is utilized. Preferably, the rack teeth are convexly curved in the plane perpendicular to the length of the rack and the pawl teeth are concavely curved complementary to the rack teeth. The arc formed by each rack tooth has a center concentric with the center of the piston, and the arc formed by each pawl tooth has a center concentric with the center of the piston in the ratchet tensioner.

In another embodiment of the present invention, a pawl includes a pawl body and a plurality of pawl teeth. The pawl is used for engaging a rack of a ratchet tensioner with a plurality of rack teeth. The pawl body has an outer circumference slidably received in a pawl bore. The pawl teeth include a first dummy tooth, a first center tooth adjacent to the first dummy tooth, a second center tooth adjacent to the first center tooth on a side opposite the first dummy tooth, and a second dummy tooth adjacent to the second center tooth on a side opposite the first center tooth. The distance between a vertical surface of the first center tooth and a vertical surface of the second center tooth is equal to a pitch of the rack teeth. A distance between a vertical surface of the first dummy tooth and the vertical surface of the first center tooth is less than the pitch of the rack teeth. A distance between the vertical surface of the second center tooth and a vertical surface of the second dummy tooth is greater than the pitch of the rack teeth. The first center tooth and the second center tooth bear all of a load from the rack and the vertical surface of the first dummy tooth, and the vertical surface of the second dummy tooth do not contact the rack teeth and are not loaded by the rack.

In yet another embodiment of the present invention, the ratchet tensioner includes a tensioner body, a piston, a first biasing member, a rack, a pawl, and a second biasing member. The tensioner body has a piston bore open at one end and a pawl bore extending into the piston bore. The piston has an outer circumference slidably received in the piston bore and a rack slot axially extending and formed as part of the outer circumference. The first biasing member biases the piston in a protruding direction. The rack includes a plurality of rack teeth and is received in the rack slot. The rack teeth are convexly curved in the plane perpendicular to the length of the rack. The pawl is slidably received in the pawl bore. The pawl includes a plurality of pawl teeth. The pawl teeth are concavely curved complementary to the rack teeth. The second biasing member biases the pawl toward the rack. The pawl teeth engage the rack teeth, thereby permitting travel of the piston in the protruding direction but resisting travel of the piston in a retracting direction opposite the protruding direction above a designed backlash.

In yet another embodiment, the method of assembling a ratchet tensioner includes the step of inserting a piston into a tensioner body with a piston bore open at one end and a pawl bore extending into the piston bore. The piston has an outer circumference slidably received in the piston bore and a rack slot axially extending and formed as part of the outer circumference. The rack slot has an open end at an outward end of the piston. The method includes the step of slidably inserting the rack into the rack slot after the step of inserting the piston, simplifying assembly due to uni-directional piston and rack insertion. The rack includes a plurality of rack teeth. The method preferably further includes the step of locating a pawl on the rack after the step of inserting the rack. The pawl is slidably received in the pawl bore. The pawl includes a plurality of pawl teeth.

DETAILED DESCRIPTION OF THE INVENTION

A ratchet tensioner of the present invention is easier to manufacture, assemble, and package than prior art tensioners and has comparable, if not superior, tensioning performance. This makes the present invention cost-effective for many and various tensioning applications. The ratchet tensioner is described in terms of several features, which individually and in combination reduce manufacturing and assembly costs and improve the performance of the tensioner.

In a first embodiment of the present invention, the rack and the piston are separate components. The simplified geometry of the rack part allows it to be manufactured as a powdered metal (PM) part. The rack sits in a rack slot of the piston. In the assembled tensioner, the rack is confined within the piston envelope such that the rack and piston both sit within the piston bore of the tensioner body, thereby eliminating the need for a rack bore. This provides greater flexibility to position the tensioner bolt holes in the absence of a rack bore and allows for a more compact design. The cylindrical piston is tooled to produce a rack slot parallel to the piston axis with the slot being open on the end facing the tensioner arm. In this embodiment, there is no need for a washer part on the rack nor is a piston shoulder feature necessary.

The open-ended slot provides several advantages over a closed-ended slot. First, the open-ended slot is more easily machined into the piston than a closed-ended slot. Second, during assembly the rack is inserted in the same direction of the piston insertion and may be done independently of piston insertion. Preferably, the rack slot has a length greater than the length of the rack to provide a backlash feature.

In a second embodiment of the present invention, the pawl assembly for engaging the rack sits in a pawl bore perpendicular to the piston bore. Preferably the tensioner has a tooled ramp angle on the side of the pawl to retract the ratchet to an open position automatically and hold it open during reset. Preferably the reset hole and the shipping hole are integrated as one feature in the pawl assembly, further simplifying manufacture and assembly. The pawl preferably has both front and rear dummy teeth to ensure that the load is shared by the center teeth. The dummy teeth provide stability to the pawl, but they do not engage the vertical surfaces of the rack teeth. The vertical surface of a tooth, as used herein, refers to the flat surface on one side of the tooth which is parallel to the direction the tooth extends outward. The front dummy tooth acts as an anti-tipping surface.

A third embodiment of the present inventions combines the features of the first and second embodiments. In this embodiment, the piston rack slot binds against the pawl side and inhibits piston rotation and mis-orientation of the rack. The rack is more robust in reacting to load from the tensioner arm. When the rack is being loaded, it is supported by the piston. In a load-sharing mode, the rack is fully bounded between the arm and the piston. The pawl dummy teeth ensure that the load is shared by the center teeth, which offer the largest contact area.

In a fourth embodiment, the rack slot and the rack are angled with respect to the piston bore such that the rack and rack slot taper toward the open end of the rack slot. The rack angle, which is the angle between the rack/piston interface and the axis of the piston, inhibits rack overextension by reducing rack momentum in the protruding direction and supplementing the pawl spring force increasing ratcheting resistance if the rack moves relative to the piston. The rack angle is preferably selected to prevent wedging of the rack between the piston and the wall of the piston bore when the piston moves in the retracting direction before the tensioner backlash provided by the difference between the length of the rack slot and the length of the rack is utilized.

A tensioner of the present invention has a relatively low rack mass, resulting in low inertial loads on the rack. The piston offers a smoother and more stable sliding interface for the rack. The rack and piston preferably share the same pad on the tensioner arm, eliminating the need for a separate rack pad on the tensioner arm. Rack length and rack slot length determine backlash, which is easily modified. It is difficult to maintain the needed tolerance with a closed piston rack slot, and the open-ended piston rack slot overcomes this problem. The ratchet is preferably locked for shipping by inserting a pin between the retainer tail and the pawl slot with the tensioner collapsed. Location of the shipping pin near the pawl facilitates integrating the reset and shipping hole on the body. The tensioner interacts with the chain drive in a similar manner to the prior art.

Figure 3:
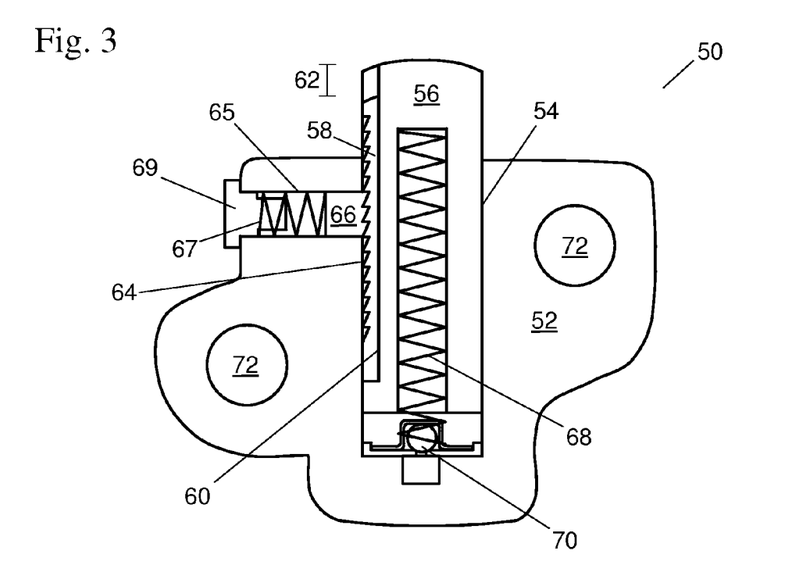
FIG. 3 shows a cross sectional view of a first embodiment of the present invention.

A sliding rack ratchet tensioner 50 in a first embodiment of the present invention is shown in FIG. 3. The tensioner body 52 has a piston bore 54 for housing the piston 56 and the rack 58. The rack 58 is slidably received in a rack slot 60 along the side of the piston 56. The rack slot 60 is open on the end facing the tensioner arm (not shown). The rack 58 is shown in a retracted position in FIG. 3, and the difference 62 between the length of the rack slot and the length of the rack provides backlash for the system. The rack 58 has rack teeth 64 for engaging a pawl 66. The pawl 66 is located in a pawl bore 65 and urged toward the rack 58 by a pawl spring 67 biased against a retainer 69.

The piston 56 is preferably hollow and urged toward the tensioner arm by a spring 68. A check valve 70 is preferably located at the base of the piston bore 54 to allow hydraulic fluid to fill the void space in the piston bore 54. Although the tensioner body 52 is shown having at least one mounting hole 72 for mounting the tensioner body 52 to a stationary surface (not shown), the tensioner may also be mounted in a cartridge-style mounting arrangement within the spirit of the present invention, where the tensioner is mounted by a thread on the outside of the body.

Figure 4:
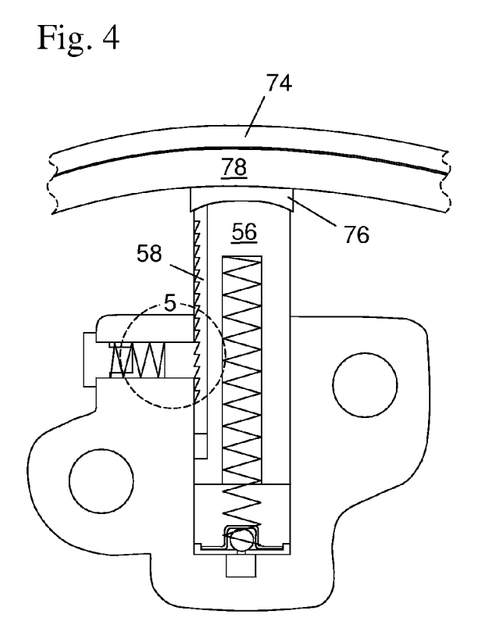
FIG. 4 shows the embodiment of FIG. 3 loaded by a tensioner arm.

Referring to FIG. 4, when the ratchet tensioner 50 is assembled and mounted for tensioning a chain or belt 74, the piston 56 extends out from the piston bore 54, extending the rack 58 along with it, to contact a tensioner pad 76 and rotate a tensioner arm 78 to take up the slack in the chain or belt 74. FIG. 4 shows the tensioner in a loaded condition. As shown in FIG. 4, the pad-contacting end of the piston 56 has a convex shape, and the pad-contacting end of the rack 58 preferably is contoured to blend with the curvature of the piston end. A flat pad-contacting end of the piston may also be used within the spirit of the present invention. The load path is simplified in the present invention in contrast to the prior art tensioner shown in FIG. 2. In the prior art tensioner, load is transferred from the tensioner arm to the piston to the rack to the pawl. In the embodiment of FIG. 4, load is transferred directly from the tensioner arm to the rack to the pawl similar to the prior art tensioner of FIG. 1. However, in the present invention, the rack is supported by the piston and is not susceptible to cantilever loading about the tensioner body when loaded by the tensioner arm. Another advantage of the direct transfer is that, in contrast to the prior art tensioner of FIG. 2, the load is not transferred through a small interface between the piston and the rack. This reduces costs by eliminating the need for tight tolerance control on the piston and rack at this small interface.

Figure 5:
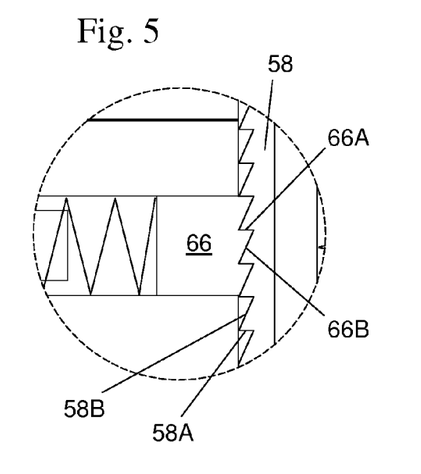
FIG. 5 shows an expanded view of the circle region 5 of FIG. 4.

Referring to FIG. 5, each tooth of the rack 58 preferably includes a vertical surface 58A and a ramp surface 58B to form a shark fin-shape. Each tooth of the pawl 66 preferably includes a vertical surface 66A and a ramp surface 66B to form a shark fin-shape.

Figure 6:
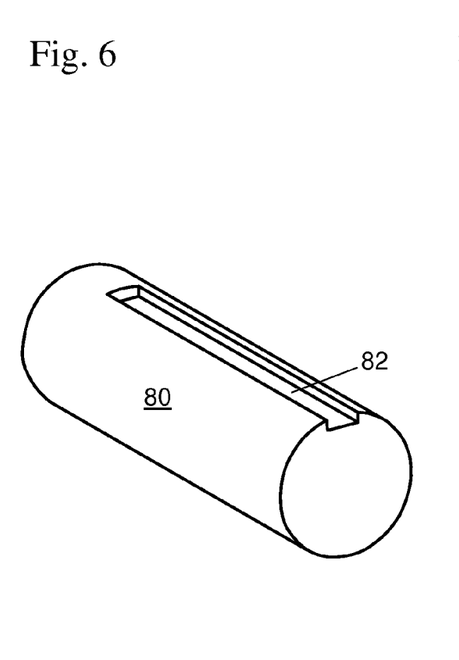
FIG. 6 shows a first embodiment of a piston of the present invention.
Figure 7:
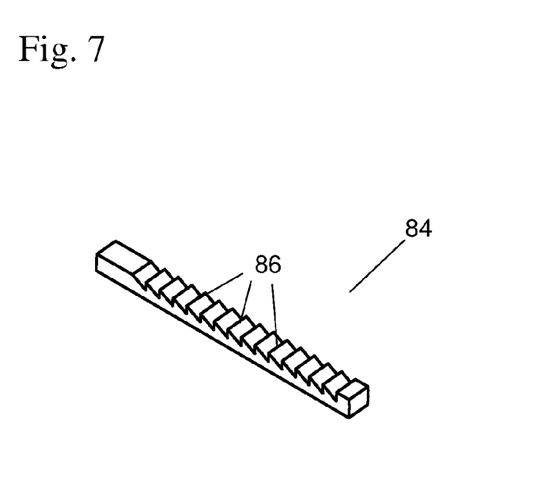
FIG. 7 shows a first embodiment of a rack of the present invention.

In a preferred embodiment, the rack is confined to a slot in the piston. A three-dimensional perspective view of a preferred piston 80 of the present invention in FIG. 6 shows the flat surfaces of the rack slot 82. A three-dimensional perspective view of a preferred rack 84 of the present invention in FIG. 7 shows the flat sides of the rack 84 and the preferred shark fin-shape of the rack teeth 86.

Figure 8:
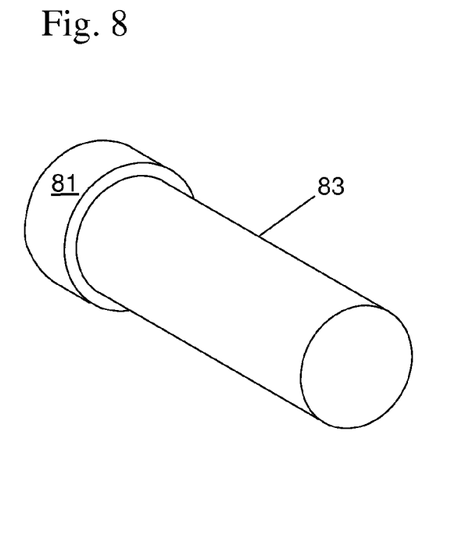
FIG. 8 shows a second embodiment of a piston of the present invention.
Figure 9:
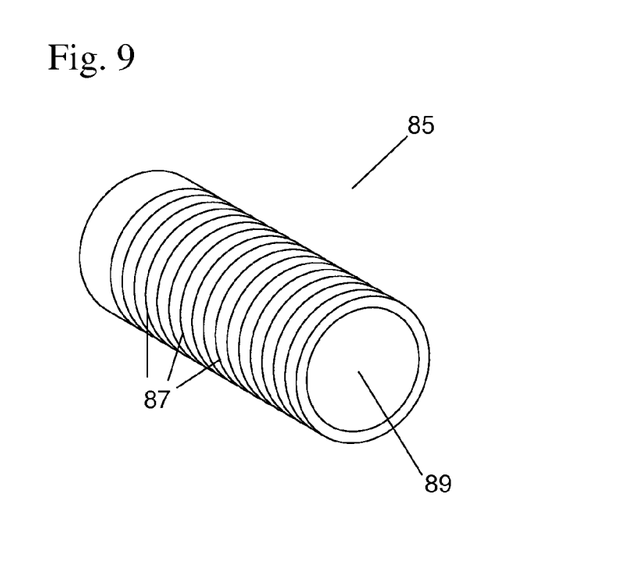
FIG. 9 shows a second embodiment of a rack of the present invention.

In an alternate embodiment, the slot extends completely around the piston. A three-dimensional perspective view of a piston 81 of the present invention in FIG. 8 shows a reduced-radius portion 83, which forms the inner surface of the rack slot when mounted in the tensioner body. A three-dimensional perspective view of a complementary rack 85 of the present invention in FIG. 9 shows the plurality of rack teeth 87, which are preferably shark fin-shaped. The rack 85 has a central hole 89, which fits around the piston in the assembled tensioner. The rack teeth 87 may extend only a portion of the way around the rack 85, or they may extend completely around the rack 85. If the rack teeth 87 extend completely around the rack 85, the rack teeth are preferably shaped to include a land on the top to act as a bearing surface against the piston bore in the tensioner body.

Figure 10:
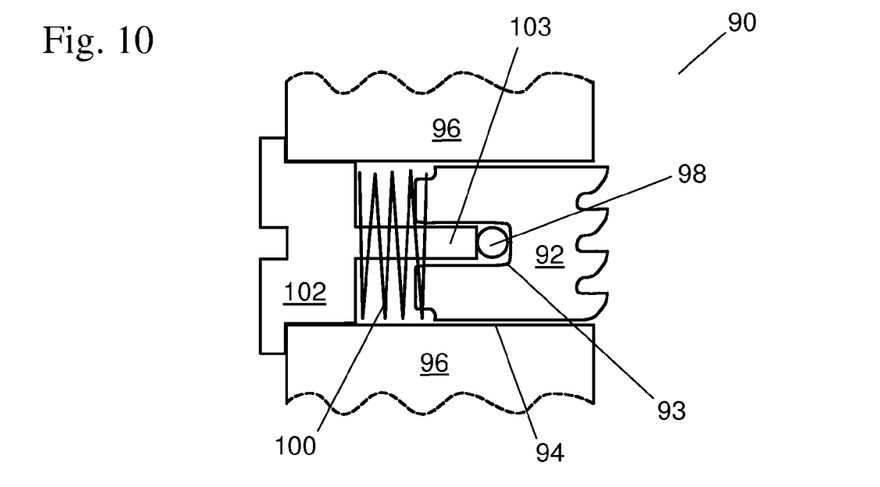
FIG. 10 shows a cross sectional view of a pawl assembly in a second embodiment of the present invention.

A pawl assembly 90 in a second embodiment of the present invention is shown in a shipping configuration in FIG. 10. The pawl 92 is mounted in a pawl bore 94 of the tensioner body 96. A shipping pin 98 extending through a reset bore between the retainer tail 103 of the retainer 102 and the pawl slot 93 holds the pawl 92 in engagement with the rack (not shown). A pawl spring 100 urges the pawl 92 away from the retainer 102.

Figure 11:
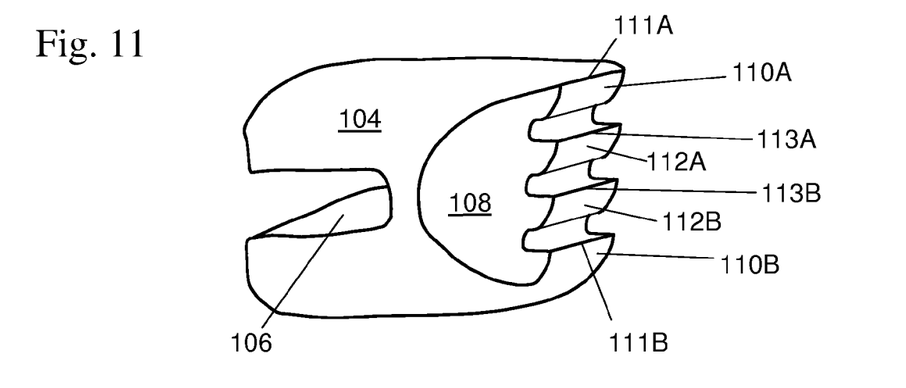
FIG. 11 shows a pawl in an embodiment of the present invention.

A three-dimensional perspective view of a pawl 104 of the present invention in FIG. 11 shows a pawl slot 106 on the end opposite the pawl teeth 110A, 110B, 112A, 112B and a tapered surface 108 tapering toward the teeth on the side of the pawl facing the shipping pin bore. The reset bore also provides access for the shipping pin. The shipping pin 98 extends through the pawl slot 106 between the pawl 92 and the retainer tail 103 of the retainer 102 to lock the tensioner in a shipping position. The pawl slot 106 engages the retainer tail 103 to maintain the correct orientation with respect to the rack teeth after assembly. When it is necessary to reset the tensioner, the shipping pin may be reinserted into the reset bore. Upon insertion, the shipping pin contacts the pawl on the tapered surface 108 and further insertion of the pin drives the pawl away from the rack until the pin is fully inserted and the tensioner is in a reset position. Thus, the shipping pin also serves as the reset pin, and the reset bore also serves as the shipping pin bore. The pawl also preferably has four teeth, an outer two 110A, 110B on the ends, which serve as dummy teeth and an inner two 112A, 112B, which serve as center teeth for engaging the rack teeth. Although more than two center teeth and more than two dummy teeth may be used, two of each is preferred. Each pawl tooth 110A, 110B, 112A, 112B has a vertical surface 111A, 111B, 113A, 113B, respectively, and ramp surfaces.

Figure 12:
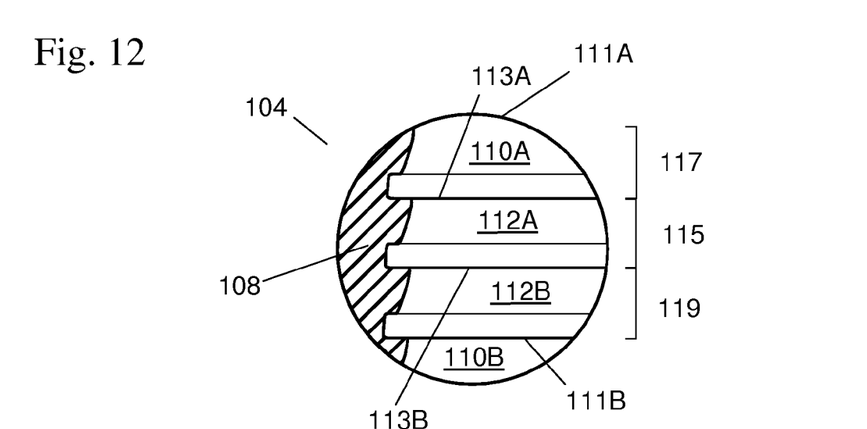
FIG. 12 shows a front view of the pawl of FIG. 11.

Viewed from the front, as in FIG. 12, the pawl 104 has a circular cross section. Even though the tapered surface 108 decreases the width of the center teeth 112A, 112B, the center teeth 112A, 112B are still wider than the dummy teeth 110A, 110B. The greater width makes the center teeth 112A, 112B stronger than the dummy teeth 110A, 110B. Although the dummy teeth 110A, 110B provide stability to the pawl 104, they do not engage the vertical surfaces of the rack teeth of the ratchet tensioner.

In order to accomplish this, the distances between the vertical surfaces 111A, 111B, 113A, 113B of the pawl teeth 110A, 110B, 112A, 112B is varied. The rack teeth preferably have a constant pitch P. In order for the center teeth 112A, 112B to share the entire load from the rack, the distance 115 between the vertical surfaces 113A, 113B of the center teeth 112A, 112B is set equal to P, the pitch for the rack teeth. The distance 117 between the vertical surface 111A of the top tooth 110A and vertical surface 113A of the upper center tooth 112A is set to be less than P. The distance 119 between the vertical surface 111B of the bottom tooth 110B and the vertical surface 113B of the lower center tooth 112B is set to be greater than P. When the pawl 104 is loaded by the rack, the two center teeth 112A, 112B receive the full load, because the dummy teeth 110A, 110B are misaligned so that their vertical surfaces 111A, 111B are not loaded by their respective rack teeth.

Figure 13:
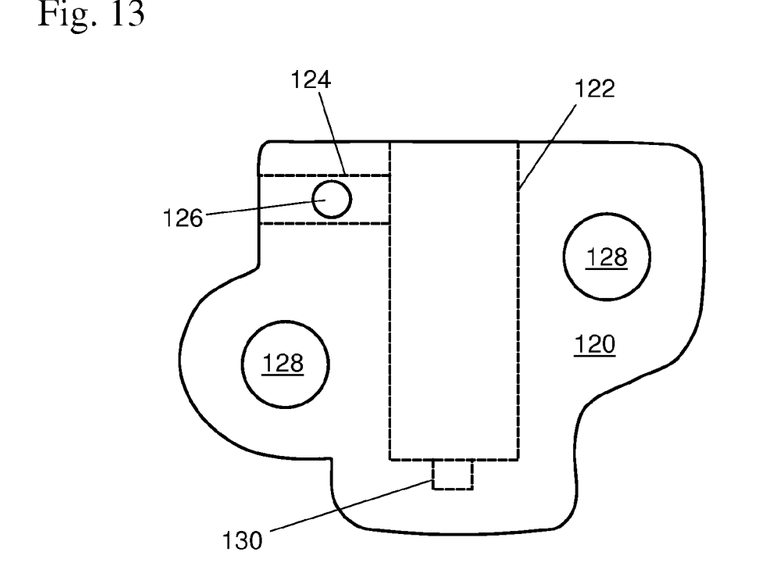
FIG. 13 shows a preferred tensioner body of the present invention.

Referring to FIG. 13, a preferred tensioner body 120 of the present invention is manufactured to have only a piston bore 122, a pawl bore 124 perpendicular to and extending into the piston bore 122, a reset bore 126 perpendicular to and extending into the pawl bore 124, at least one mounting bore 128 for mounting the tensioner body 120 to a stationary surface, and a fluid port 130 for directing hydraulic fluid into the piston bore 122. The use of a single hole for the shipping pin and the reset pin and a single hole for both the piston and the rack reduces manufacturing costs and produces a more compact design with flexibility for placement of the mounting holes.

Figure 14:
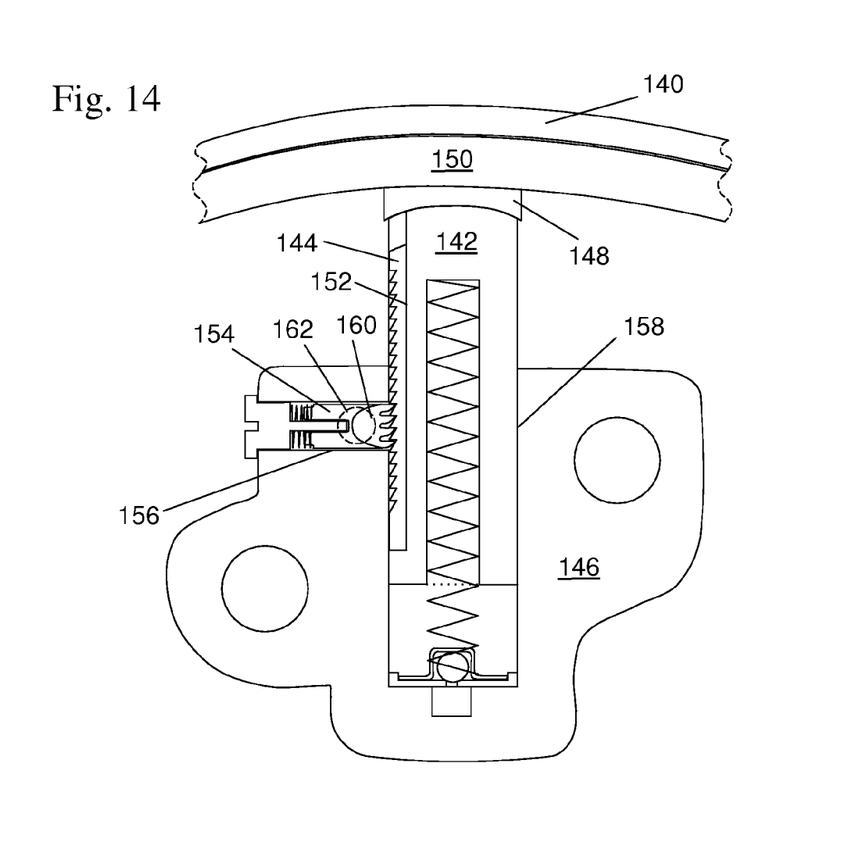
FIG. 14 shows a cross sectional view of a third embodiment of the present invention.

Referring to FIG. 14, in a preferred embodiment, the ratchet tensioner is shown engaging a chain or belt 140. The piston 142 and the rack 144 both extend from the tensioner body 146 to drive the pad 148 into the tensioner arm 150, thereby rotating the tensioner arm 150 into the chain or belt 140 to tension the chain or belt 140. The pad 148 may be a separate piece, as shown in FIG. 14, or it may be integral with the tensioner arm 150. The rack 144 is slidably received in a rack slot 152, which is longer than the rack 144 to provide backlash. The rack slot 152 is open on one end and the end of the rack 144 is contoured to the curved shape of the end of the piston 142. In FIG. 14, the piston 142 is in contact with the pad 148, while the rack 144 is in the fully retracted position on the piston 142 providing the designed backlash. The shark fin-shaped teeth of the rack 144 are engaged with the teeth of the pawl 154. The pawl bore 156 is perpendicular to the piston bore 158. The pawl 154 has four teeth, two outer dummy teeth and two center teeth with greater area to share the load. The pawl 154 has a tapered side 160 for automatic reset of the ratchet tensioner by insertion of a pin into the reset bore 162.

Figure 15:
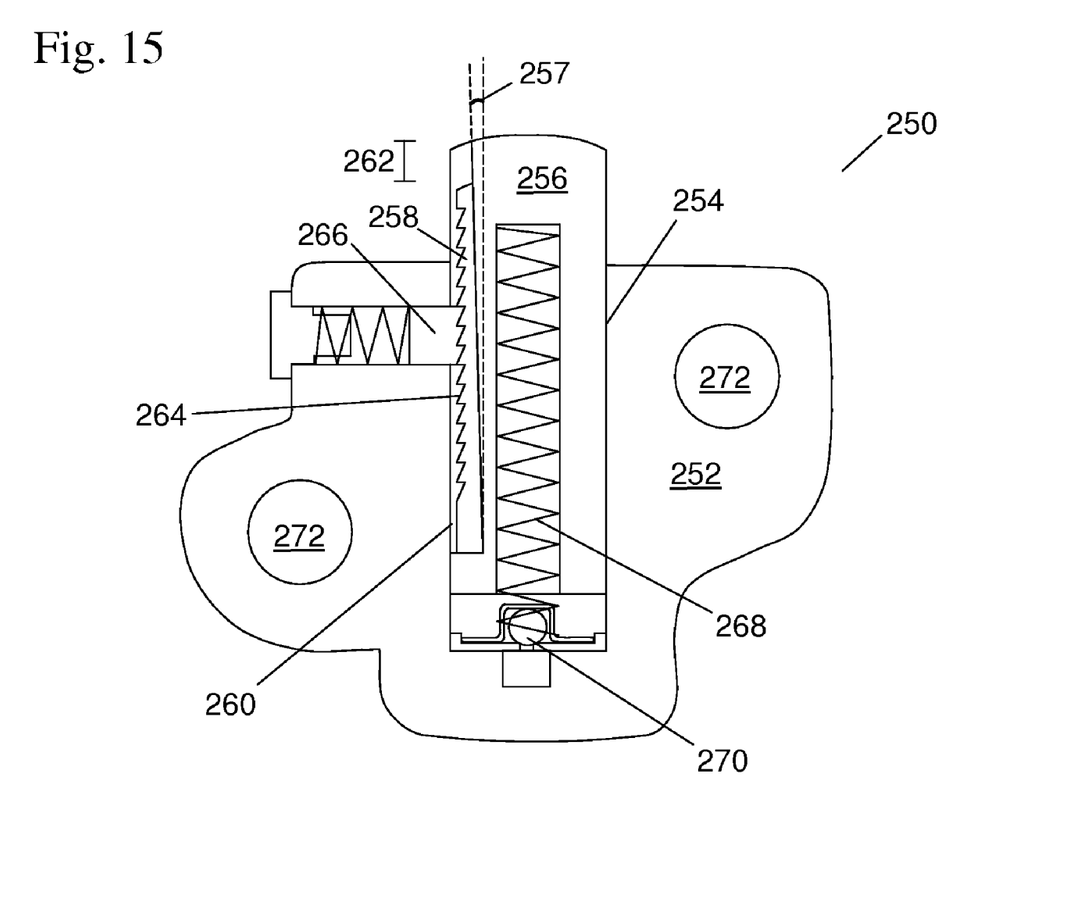
FIG. 15 shows a cross sectional view of a fourth embodiment of the present invention.

A sliding rack ratchet tensioner 250 in a fourth embodiment of the present invention is shown in FIG. 15. The tensioner body 252 has a piston bore 254 for housing the piston 256 and the rack 258. The rack 258 is slidably received in a rack slot 260 along the side of the piston 256. The rack slot 260 is open on the end facing the tensioner arm (not shown). The rack 258 is shown in a ratcheting position in FIG. 15, and the difference 262 between the length of the rack slot and the length of the rack provides backlash for the system. The rack 258 has rack teeth 264 for engaging a pawl 266.

The piston 256 is preferably hollow and urged toward the tensioner arm by a spring 268. A check valve 270 is preferably located at the base of the piston bore 254 to allow hydraulic fluid to fill the void space in the piston bore 254. Although the tensioner body 252 is shown having at least one mounting hole 272 for mounting the tensioner body to a stationary surface (not shown), the tensioner may also be mounted in a cartridge-style mounting arrangement within the spirit of the present invention, where the tensioner is mounted by a thread on the outside of the body.

In this embodiment, the wall of the rack slot 260 and the surface of the rack 258 on the side opposite the teeth are tilted at a rack angle 257 with respect to the axis of the piston bore. The rack angle 257 reduces rack momentum in the protruding direction and increases ratcheting resistance by adding to the pawl force, thereby inhibiting rack overextension if the rack moves relative to the piston. The rack angle 257 is selected to prevent wedging of the rack 258 between the piston 256 and the piston bore 254 as the piston moves in the retracting direction before the tensioner backlash is utilized.

Figure 16:
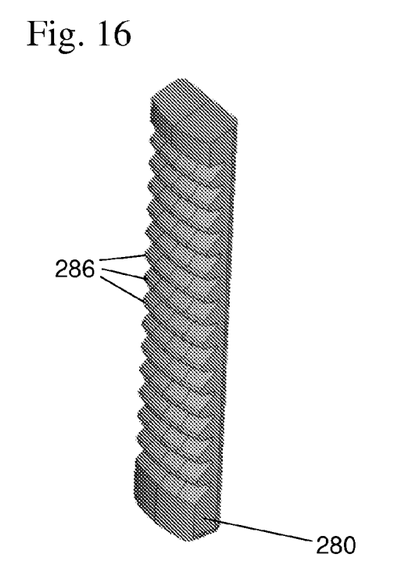
FIG. 16 shows a three-dimensional view of a rack with curved teeth in an embodiment of the present invention.
Figure 17:
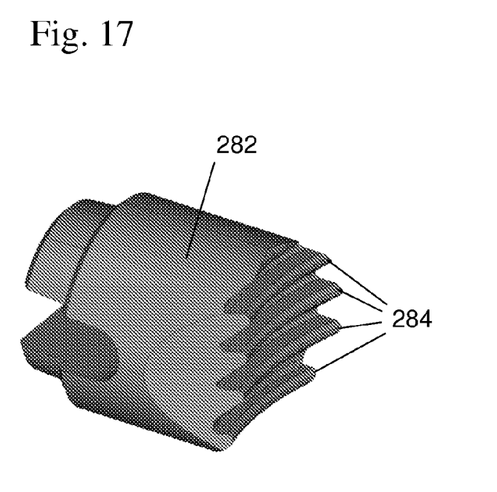
FIG. 17 shows a three-dimensional view of a pawl with curved teeth in an embodiment of the present invention.
Figure 18:
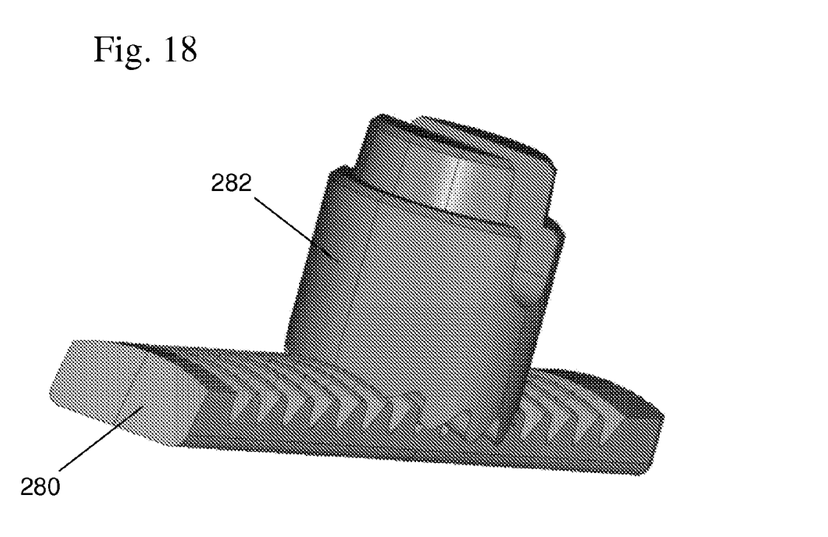
FIG. 18 shows the pawl of FIG. 17 engaging the rack of FIG. 16.

In a preferred embodiment of the present invention, the pawl and rack have teeth curved complementary to each other along their length, as shown in FIG. 16 and FIG. 17. This improves the anti-rotation robustness of the sliding rack 280. The rack 280 and pawl 282 preferably have teeth with a radius of curvature, R, such that in the assembled ratchet tensioner when the pawl 282 is engaging the rack 280, as shown in FIG. 18, the arcs formed by the curved teeth have centers at the center of the piston. The pawl teeth 284 have a concave curved shape, while the rack teeth 286 have a convex curved shape. When the pawl and rack have straight teeth, rotation of the piston may pry up the pawl, allowing the pawl to ride over the piston outer diameter and the rack to lose orientation with the pawl. With curved teeth, prying up of the pawl 282 is prevented. The curved teeth provide increased interference between the side of the rack slot and the pawl, thereby locking the piston against rotation and maintaining rack orientation with respect to the pawl.

A preferred method of manufacturing a tensioner of the present invention includes the step of drilling only a piston bore into the tensioner body, a pawl bore into the tensioner body perpendicular to and into the piston bore, a reset bore into the tensioner body perpendicular to and into the pawl bore, at least one mounting hole through the tensioner body perpendicular to the piston bore, and a fluid port for directing fluid into the piston bore.

A preferred method of assembling a tensioner of the present invention includes the step of inserting a piston having an open-ended rack slot into a piston bore in a tensioner body. The preferred method also includes the step of inserting a rack into the piston bore and into the rack slot after insertion of the piston into the piston bore, simplifying assembly due to uni-directional piston and rack insertion. In an embodiment including a rack angle, the rack and the piston are assembled outside the tensioner and inserted together into the tensioner, but the open-ended slot makes this assembly easier than for the prior art of FIG. 2. Next, the method includes the steps of mounting the pawl in the pawl bore of the tensioner body followed by the spring and the retainer. These components may also be inserted as a sub-assembly into the pawl bore. Finally, the method includes inserting the shipping pin through the reset bore in between the retainer tail and the pawl slot to lock the tensioner in the shipping position.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A ratchet tensioner comprising:
   a tensioner body having a piston bore open at one end and a pawl bore extending into the piston bore;
   a piston having an outer circumference slidably received in the piston bore and a rack slot axially extending and formed as part of the outer circumference, the rack slot having an open end at an outward end of the piston;
   a first biasing member biasing the piston in a protruding direction;
   a rack comprising a plurality of rack teeth and slidably received in the rack slot;
   a pawl slidably received in the pawl bore, the pawl comprising a plurality of pawl teeth; and
   a second biasing member biasing the pawl toward the rack;
   such that the pawl teeth engage the rack teeth, thereby permitting travel of the piston in the protruding direction but resisting travel of the piston in a retracting direction opposite the protruding direction above a designed backlash.

2. The ratchet tensioner of claim 1, wherein the pawl has an outer circumference slidably received in the pawl bore and the plurality of pawl teeth comprises a first dummy tooth, a first center tooth adjacent to the first dummy tooth, a second center tooth adjacent to the first center tooth on a side opposite the first dummy tooth, and a second dummy tooth adjacent to the second center tooth on a side opposite the first center tooth; and
   wherein a distance between a vertical surface of the first center tooth and a vertical surface of the second center tooth is equal to a pitch of the rack teeth, a distance between a vertical surface of the first dummy tooth and the vertical surface of the first center tooth is less than the pitch of the rack teeth, and a distance between the vertical surface of the second center tooth and a vertical surface of the second dummy tooth is greater than the pitch of the rack teeth;
   such that the vertical surface of the first center tooth and the vertical surface of the second center tooth bear load from the rack teeth and the vertical surface of the first dummy tooth and the vertical surface of the second dummy tooth do not contact the rack teeth and are not loaded by the rack.

3. The ratchet tensioner of claim 1, wherein the tensioner has a reset bore extending into the pawl bore and the pawl has a tapered surface facing the reset bore and tapering toward the pawl teeth such that a shipping pin inserted into the reset bore slides along the tapered surface to push the pawl away from the rack and into a reset position.

4. The ratchet tensioner of claim 3, wherein the pawl has a pawl slot on a side opposite the pawl teeth such that insertion of the shipping pin through the reset bore in between a retainer tail of a retainer and the pawl slot maintains the pawl teeth in engagement with the rack teeth in a shipping position by not allowing the pawl to retract.

5. The ratchet tensioner of claim 3, wherein the reset bore is perpendicular to the pawl bore.

6. The ratchet tensioner of claim 3 further comprising a retainer having a retainer tail inserted into the pawl bore, wherein the pawl slot engages the retainer tail to maintain a correct orientation of the pawl teeth with respect to the rack teeth after assembly.

7. The ratchet tensioner of claim 1, wherein the piston is hollow and the piston and the tensioner body define an inner space for hydraulic fluid, the ratchet tensioner further comprising a check valve at a bottom portion of the piston bore to permit fluid flow into the inner space and to block fluid flow in a reverse direction.

8. The ratchet tensioner of claim 1, wherein the pawl bore is perpendicular to the piston bore.

9. The ratchet tensioner of claim 1, wherein the rack has a length less than a length of the rack slot to provide the designed backlash.

10. The ratchet tensioner of claim 1, wherein the outward end of the piston has a convex shape and an outward end of the rack is contoured to the convex shape for contacting a tensioner arm pad attached to or integral with a tensioner arm for contacting and tensioning a chain or belt.

11. The ratchet tensioner of claim 1, wherein the rack teeth and the pawl teeth have a shark fin-shape.

12. The ratchet tensioner of claim 1, wherein the rack slot and a side of the rack opposite the rack teeth are oriented at a rack angle with respect to the axis of the piston bore such that the rack and the rack slot taper toward the open end of the rack slot.

13. The ratchet tensioner of claim 12, wherein the rack angle is selected such that wedging of the rack between the piston and a wall of the piston bore is prevented when the piston moves in the retracting direction, before the designed backlash provided by a difference between a length of the rack slot and a length of the rack is utilized.

14. The ratchet tensioner of claim 1, wherein the rack teeth are convexly curved in the plane perpendicular to the length of the rack and the pawl teeth are concavely curved complementary to the rack teeth.

15. The ratchet tensioner of claim 14, wherein an arc formed by each rack tooth has a center concentric with the center of the piston, and an arc formed by each pawl tooth has a center concentric with the center of the piston in the ratchet tensioner.

16. A pawl for engaging a rack, having a plurality of rack teeth, of a ratchet tensioner, the pawl comprising:
 a pawl body having an outer circumference slidably received in a pawl bore; and
 a plurality of pawl teeth comprising a first dummy tooth, a first center tooth adjacent to the first dummy tooth, a second center tooth adjacent to the first center tooth on a side opposite the first dummy tooth, and a second dummy tooth adjacent to the second center tooth on a side opposite the first center tooth;
 wherein a distance between a vertical surface of the first center tooth and a vertical surface of the second center tooth is equal to a pitch of the rack teeth, a distance between a vertical surface of the first dummy tooth and the vertical surface of the first center tooth is less than the pitch of the rack teeth, and a distance between the vertical surface of the second center tooth and a vertical surface of the second dummy tooth is greater than the pitch of the rack teeth;
 such that the vertical surface of the first center tooth and the vertical surface of the second center tooth bear load from the rack teeth and the vertical surface of the first dummy tooth and the vertical surface of the second dummy tooth do not contact the rack teeth and are not loaded by the rack.

17. The pawl of claim 16, wherein the pawl has a tapered surface tapering toward the pawl teeth such that a shipping pin inserted into a reset bore in a tensioner body slides along the tapered surface to push the pawl away from the rack and into a reset position.

18. The pawl of claim 17, wherein the pawl has a pawl slot on a side opposite the pawl teeth such that insertion of the shipping pin through the reset bore in between a retainer tail of a retainer and the pawl slot maintains the pawl teeth in engagement with the rack teeth in a shipping position by not allowing the pawl to retract.

19. The pawl of claim 16, wherein the pawl teeth have a shark fin-shape.

20. The pawl of claim 16, wherein the pawl teeth are concavely curved along their length.

21. A method of assembling a ratchet tensioner comprising the steps of:
 a) inserting a piston into a tensioner body having a piston bore open at one end and a pawl bore extending into the piston bore, the piston having an outer circumference slidably received in the piston bore and a rack slot axially extending and formed as part of the outer circumference, the rack slot having an open end at an outward end of the piston;
 b) after step (a), slidably inserting a rack comprising a plurality of rack teeth in the rack slot.

22. The method of claim 21 further comprising the step of:
 c) after step (b), locating a pawl, slidably received in the pawl bore and comprising a plurality of pawl teeth, on the rack.

* * * * *